Nov. 27, 1956 G. C. HARPER ET AL 2,771,701
FROG NET
Filed Sept. 8, 1954
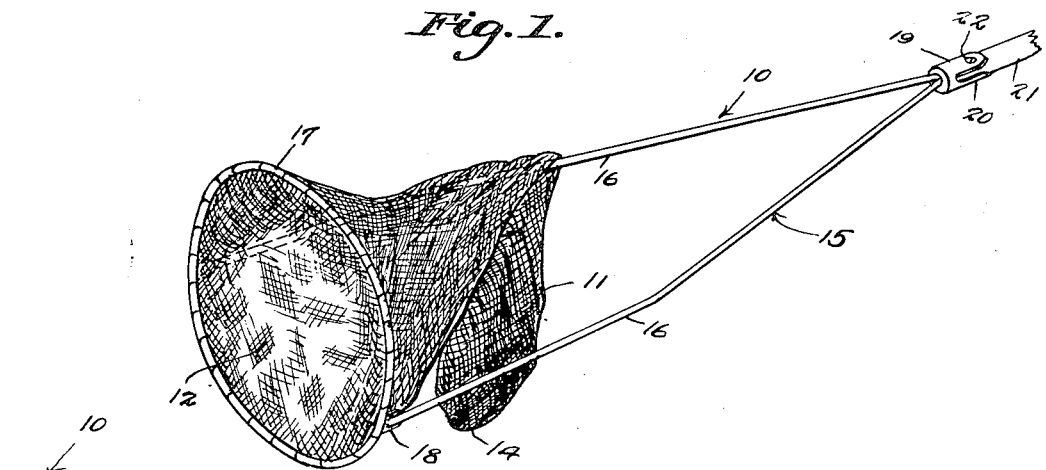
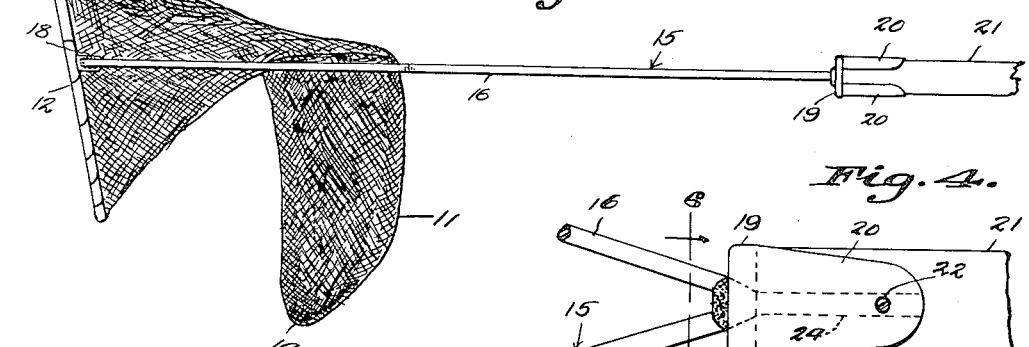
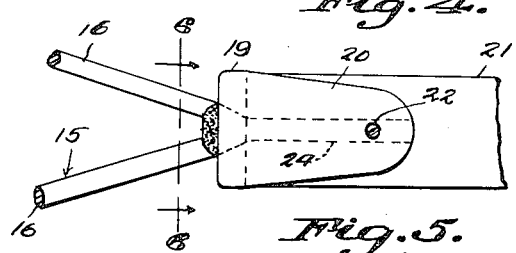
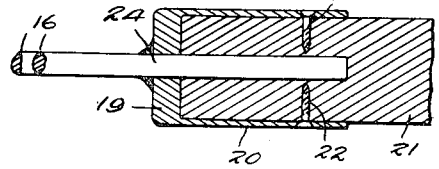
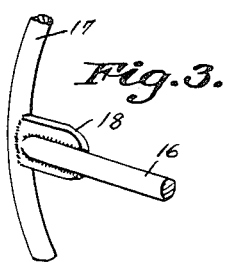
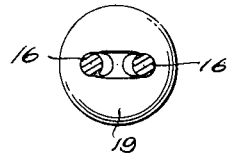
George C. Harper
Carl T. Wilson
INVENTORS,
BY *CA Snow & Co.*
ATTORNEYS.

United States Patent Office 2,771,701
Patented Nov. 27, 1956

2,771,701

FROG NET

George C. Harper and Carl T. Wilson, Shreveport, La.

Application September 8, 1954, Serial No. 454,807

2 Claims. (Cl. 43—7)

This invention relates to a frog net and more particularly to an improved net for catching frogs.

It is an important object of this invention to provide a novel, improved frog net of the kind to be more particularly described hereinafter to be carried by a hand of a person hunting and catching frogs, the frog net having a flexible net for trapping the frog to be caught.

Another object of this invention is to provide a novel, improved, frog net of this kind having a bag supported from a V-shaped support rod, said bag being adapted to entrap a frog therein.

Still another object of this invention is to provide a novel, improved, frog net of this kind which may be easily manufactured at a low cost with a minimum of equipment so that the frog net may be sold to the frog net buying public at an economical price.

Other and further objects and advantages of the invention will be hereinafter described and the novel features thereof defined in the appended claims.

In the drawings:

Fig. 1 is an isometric view, partly broken away, of a novel, improved, frog net constructed according to our invention.

Fig. 2 is a side elevation of the net, partly broken away.

Fig. 3 is an enlarged detailed view, of the connection between the supporting ring and arm.

Fig. 4 is a fragmentary plan view of the connection between the bag support and handle therefor.

Fig. 5 is a fragmentary longitudinal section in elevation of the connection in Fig. 4.

Fig. 6 is a transverse section taken on the line 6—6 of Fig. 4.

When hunting for and catching frogs it has been the custom to use a net for trapping the frog and it is a principal purpose of this invention to provide a net to be handled by a hunter for frogs so that he may catch, or entrap, a frog without injuring the same.

There is shown in the drawings a frog net 10 constructed according to an embodiment of our invention.

The frog net 10 is formed with an elongated net or tubular bag 11 into which the frog to be caught may be enclosed.

The elongated net or bag 11 has an open end 12 and a closed end 14 with the bag depending from a support 15.

The support 15 includes a pair of longitudinally extending arms 16 which are secured together at one end thereof and spaced apart at the other end with the open end 12 of the bag 11 secured between the arms 16 at their open end and the said bag 11 depending therefrom.

A bag supporting ring 17 is secured to the divergent ends of the arms 16, the ring 17 having a tab or gusset 18 extending outwardly therefrom perpendicular to the ring 17 and longitudinally of the arms 16 to which they are secured as clearly shown in Fig. 3 of the drawings.

A handle 21 is secured at the convergent ends of the arms 16 of support member 15 having its longitudinal axis disposed in the same plane as the said arms 16. The handle is secured to a handle engaging member 19 which in this case appears as a disc, this disc or member 19 being perpendicular to the other end of the support 15 and arms 16 therefor.

Handle engaging concavo-convex arms 20 are extended outwardly from the handle engaging member 19 in a direction opposite to the direction of the extension of the net supporting arms 16.

The concavo-convex handle engaging arms 20 are adapted to engage on the opposite sides of one end of a more or less cylindrical handle 21, the handle engaging arms 20 being concavo-convex in cross sectional configuration for firmly engaging one end of the handle 21. It is not necessary that the handle 21 be cylindrical in configuration but the handle engaging arms 20 are concavo-convex on their facing sides for firmly engaging the outer surface of the cylindrical handle 21. The handle 21 is secured to one end of the support 15 remote from the elongated net or bag 11 and screws 22 are shown as engaging through the concavo-convex handle engaging arms 20 and into the handle 21 for firmly securing the handle to the support while the frog net 10 is being handled by a person hunting a frog.

Also secured to the support 15 and extending outwardly therefrom in a direction opposite from the bag supporting ring 17 and the frog engaging or entrapping net 11 there is provided a shaft 24 engaging within one end of the handle 21, the shaft 24 being secured to the handle engaging member or disc 19 which handle engaging member or disc 19 is engageable with one end of the handle 21 as is clearly noted in Fig. 5 of the drawings.

As most all of the frog net 10 and support 15 therefor is made of metal save for the wooden handle 21, suitable welding may be used at all of the connecting points of the elements of the frog net 10.

In the use and operation of the frog net 10 when a frog to be caught is initially sighted, the frog landing net or bag 11 is draped over one end of the spaced apart arms 16 of the support 15 as clearly indicated in Figs. 1 and 2 of the drawings. In this manner the frog trapping bag or net is engaged over the support in the hands of the hunter. A strong spotlight may be then trained for engagement of the light with the frog so that the hunter may approach the frog and the frog will jump into the net. In most cases the frog will capture itself if and when the ring 17 is placed directly over and about him. The handle 21 is then manipulated upwardly so that the frog in the bag 11 hangs in the position seen in Fig. 1. As the handle is moved further up the weighted inner end of the bag hangs downwardly over the side of ring 17.

While the specific details of one embodiment of this invention have been herein shown and described, the invention is not confined thereto as changes and alterations may be made without departing from the spirit and scope thereof as defined in the appended claims.

We claim:

1. A frog net, comprising an elongated handle, supporting arms, bag supporting ring and flexible bag, the supporting arms extending outwardly and diverging from the end of the handle, the ring being attached to the ends of the arms in a plane transverse to the axis of the handle, and the bag being elongated and having an open end attached around the periphery of the ring.

2. The frog net of claim 1, in which the inner end of the flexible net is closed and the flexible net being of a size to swing freely through the space between the supporting arms.

References Cited in the file of this patent

UNITED STATES PATENTS

| 135,961 | Bartlett | Feb. 18, 1873 |
| 816,499 | Pierce | Mar. 27, 1906 |
| 998,429 | Suck | July 18, 1911 |
| 1,007,758 | White | Nov. 7, 1911 |